US011157537B2

(12) United States Patent
Iyer et al.

(10) Patent No.: US 11,157,537 B2
(45) Date of Patent: Oct. 26, 2021

(54) METHOD AND SYSTEM FOR SUMMARIZING CONTENT BASED ON USER PREFERENCES

(71) Applicant: Wipro Limited, Bangalore (IN)

(72) Inventors: Manjunath Ramachandra Iyer, Bangalore (IN); Chandrashekar Bangalore Nagaraj, Bangalore (IN); Shashidar Soppin, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/930,809

(22) Filed: May 13, 2020

(65) Prior Publication Data
US 2021/0303610 A1 Sep. 30, 2021

(30) Foreign Application Priority Data
Mar. 26, 2020 (IN) .............................. 202041013185

(51) Int. Cl.
*G06F 40/20* (2020.01)
*G06F 16/34* (2019.01)
*G06F 16/332* (2019.01)
*G06F 16/335* (2019.01)

(52) U.S. Cl.
CPC .......... *G06F 16/345* (2019.01); *G06F 16/335* (2019.01); *G06F 16/3328* (2019.01); *G06F 16/3329* (2019.01); *G06F 40/20* (2020.01)

(58) Field of Classification Search
CPC .............. G06F 16/345; G06F 16/3328; G06F 16/3329; G06F 16/335; G06F 40/30; G06F 16/367; G06F 16/24578; G06F 40/20; G06F 40/295; G06F 40/205; G06F 40/40
See application file for complete search history.

(56) References Cited

U.S. PATENT DOCUMENTS

| 5,838,323 | A  | * | 11/1998 | Rose ....................... G06F 40/20 715/236 |
| 6,963,830 | B1 |   | 11/2005 | Nakao |
| 7,263,530 | B2 | * | 8/2007  | Hu ......................... G06F 16/345 |
| 8,271,502 | B2 | * | 9/2012  | Svore ..................... G06F 16/345 707/748 |
| 10,043,516 | B2 | * | 8/2018  | Saddler ............... G10L 15/1815 |
| 10,691,737 | B2 | * | 6/2020  | Parikh ................. G06F 16/9535 |
| 2005/0220351 | A1 | * | 10/2005 | Vanderwende ....... G06F 16/367 382/229 |

(Continued)

FOREIGN PATENT DOCUMENTS

CN 108153864 A 6/2018

*Primary Examiner* — Wilson W Tsui

(74) *Attorney, Agent, or Firm* — Finnegan, Henderson, Farabow, Garrett & Dunner, LLP

(57) ABSTRACT

A method and system for summarizing content based on user preferences is disclosed. The method includes identifying a set of relevant objects from a set of objects based on a relevancy score corresponding to each of the set of objects extracted from a plurality of sentences. The method further includes generating a link graph between each of the plurality of sentences. The method further includes assigning a weight to each of the plurality of sentences based on a retention probability. The method further includes generating a summarized content from the plurality of sentences based on the user preferences, the link graph, and the weight associated with each of the plurality of sentences.

13 Claims, 12 Drawing Sheets

(56) References Cited

U.S. PATENT DOCUMENTS

| | | | |
|---|---|---|---|
| 2015/0269153 A1* | 9/2015 | Fink | G06F 40/30 |
| | | | 707/750 |
| 2015/0339288 A1* | 11/2015 | Baker | G06F 40/166 |
| | | | 704/9 |
| 2017/0161242 A1* | 6/2017 | Clark | G06F 40/151 |
| 2020/0349222 A1* | 11/2020 | Kadambi | G06F 40/205 |

* cited by examiner

| Reference object 602 | Interacting objects 604 | Nature of interaction 606 | Attention 608 | Attention Objects 610 |
|---|---|---|---|---|
| John | Tom | read a book | Implicit Very Important | Jerry John |
| Tom | Jerry | walking | Important | Tom Jerry |
| Tom | Jerry | fought | Important | fought |
| Tom |  | Hungry | Regular | hungry |
| Tom | Food | Ate | Related Regular | Hungry ate |
| John |  | Slept | Regular | John Slept |

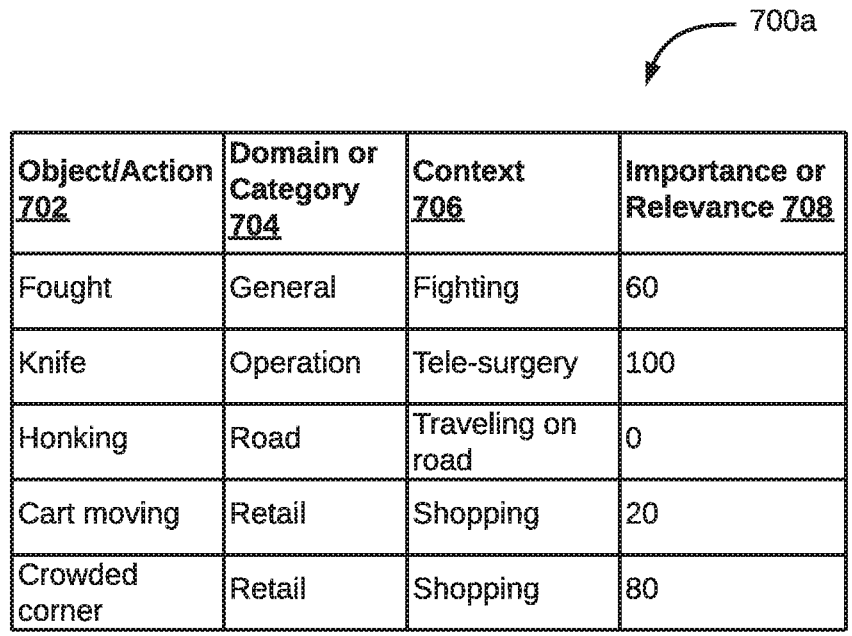
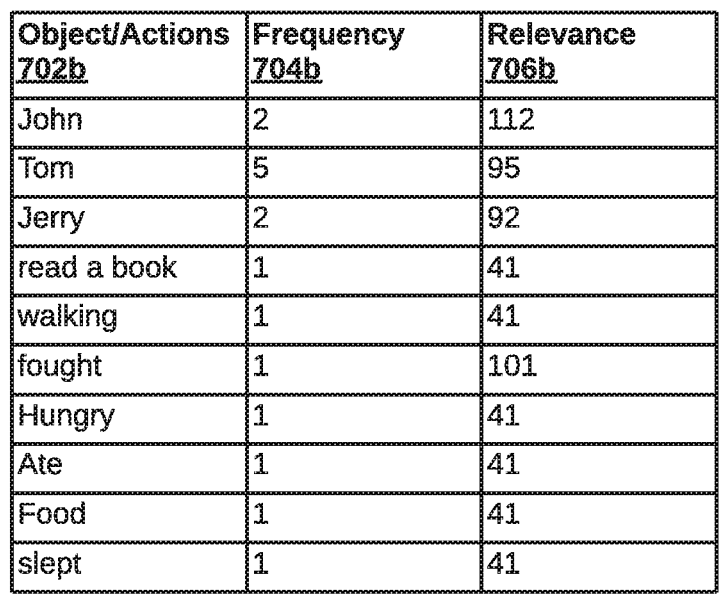
FIG. 7

| ID 802 | Links 804 | Object/Actions 702b | Frequency 704b | Relevance 706b |
|---|---|---|---|---|
| 1 | 2, 3, 4, 10 | John | 2 | 112 |
| 2 | 3, 1, 4, 5, 6, 7, 8, 9 | Tom | 5 | 95 |
| 3 | 2, 1, 4, 5, 6 | Jerry | 2 | 92 |
| 4 | 1, 2, 3 | read a book | 1 | 41 |
| 5 | 1, 2, 3 | walking | 1 | 41 |
| 6 | 1, 2, 3 | fought | 1 | 101 |
| 7 | 2 | Hungry | 1 | 41 |
| 8 | 2 | Ate | 1 | 41 |
| 9 | 2 | Food | 1 | 41 |
| 10 | 1 | slept | 1 | 41 |

| S. No. | Scenario | Forward Retention Weightage |
|---|---|---|
| 1. | a named entity A appears only once and does not interacts with any another named entity | 0 |
| 2. | a named entity A interacts with another named entity B both of which appear once | L |
| 3. | a named entity A appears only once (i.e., not again) and interacts with another named entity B that may further interact other named entities in the document m times | m |
| 4. | a named entity A appears m times and does not interacts with any another named entity | m |
| 5. | a named entity A interacts with another named entity B, n times | n |
| 6. | a named entity A interacts L1 times with another named entity B that may further interact other named entities in the document m1 times | L1m1 |
| 7. | a named entity A interacts L1 times with another named entity B that may further interact with other named entities in the document m1 times and L2 time with named entity C that interacts with other named entities m2 times | L1m1+L2m2+.. |

FIG. 10

METHOD AND SYSTEM FOR SUMMARIZING CONTENT BASED ON USER PREFERENCES

TECHNICAL FIELD

This disclosure relates generally to content summarization, and more particularly to method and system for summarizing content based on user preferences.

BACKGROUND

Through expanded exposure to digital devices, users may choose to download more and more content and store the same on their devices. A lot of content available online may seem to be of value to the user. However, it may be impossible for the user to access all such content. As a result, the user may request for summarization of interested content in a compressed form in order to be able to access such vast availability of content.

However, most of conventional content summarization systems and methods generate summarized content that may either be larger than the content required by the user or may lack the purpose of summarization. In addition, sometimes the summarized content may be too short such that the required/important details of the content requested by the user may be missed out. Other conventional content summarization systems and methods perform summarization or compression to generate only a single view summary for the content based on user interest. These conventional content summarization systems and methods may lack in capability for providing flexibility in controlling a degree of content summarization. Moreover, they may also lack capability for providing flexibility to change the degree of summarization for the content request by the user, based on availability of memory, processing time, and user requirements.

In addition, the content summarized by these conventional content summarization systems and methods may not retain meaning of the content being summarized in conformance with the degree of summarization specified. The summarized content thus generated may still include ambiguity, missing context, and unlinked sentences. Moreover, the conventional content summarization systems and methods receive and compare each piece of content with other parts of content available in the document. This process of comparing each piece of content with other parts may be time consuming, as it needs to be repeated for all parts of the content within the document in order to generate the summarized content. Therefore, a robust and efficient method and system is needed for generating a holistic summarization of the content by providing a real time and loss less compression of multimedia content to a required degree.

SUMMARY

In an embodiment, a method for summarizing content based on user preferences is disclosed. In one embodiment, the method may include identifying a set of relevant objects from a set of objects based on a relevancy score corresponding to each of the set of objects extracted from a plurality of sentences. The relevancy score for each of the set of objects is determined based on an associated attention score, probability score, and domain score. The plurality of sentences are retrieved from the content. The method may further include generating a link graph between each of the plurality of sentences. The link graph is generated based on the relevancy score determined for each of the set of objects. The method may further include assigning a weight to each of the plurality of sentences based on a retention probability. The retention probability is determined based on a position of a sentence in flow among the plurality of sentences and an interaction of the sentence with remaining sentences in the plurality of sentences. The method may further include generating a summarized content from the plurality of sentences based on the user preferences, the link graph, and the weight associated with each of the plurality of sentences.

In another embodiment, a system for summarizing content based on user preferences is disclosed. The system includes a processor and a memory communicatively coupled to the processor, wherein the memory stores processor instructions, which, on execution, causes the processor to identify a set of relevant objects from a set of objects based on a relevancy score corresponding to each of the set of objects extracted from a plurality of sentences. The relevancy score for each of the set of objects is determined based on an associated attention score, probability score, and domain score. The plurality of sentences are retrieved from the content. The processor instructions further cause the processor to generate a link graph between each of the plurality of sentences. The link graph is generated based on the relevancy score determined for each of the set of objects.

In yet another embodiment, a non-transitory computer-readable storage medium is disclosed. The non-transitory computer-readable storage medium has instructions stored thereon, a set of computer-executable instructions causing a computer comprising one or more processors to perform steps comprising identifying a set of relevant objects from a set of objects based on a relevancy score corresponding to each of the set of objects extracted from a plurality of sentences, wherein the relevancy score for each of the set of objects is determined based on an associated attention score, probability score, and domain score, and wherein the plurality of sentences are retrieved from the content; generating a link graph between each of the plurality of sentences, wherein the link graph is generated based on the relevancy score determined for each of the set of objects; assigning a weight to each of the plurality of sentences based on a retention probability, wherein the retention probability is determined based on a position of a sentence in flow among the plurality of sentences and an interaction of the sentence with remaining sentences in the plurality of sentences; and generating a summarized content from the plurality of sentences based on the user preferences, the link graph, and the weight associated with each of the plurality of sentences.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 7 illustrates a table representing a domain score, a relevancy score and a frequency score corresponding to each of a set of objects, in accordance with an exemplary embodiment.

FIG. 10 illustrates a table depicting a weight assigned to each of a plurality of sentences, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
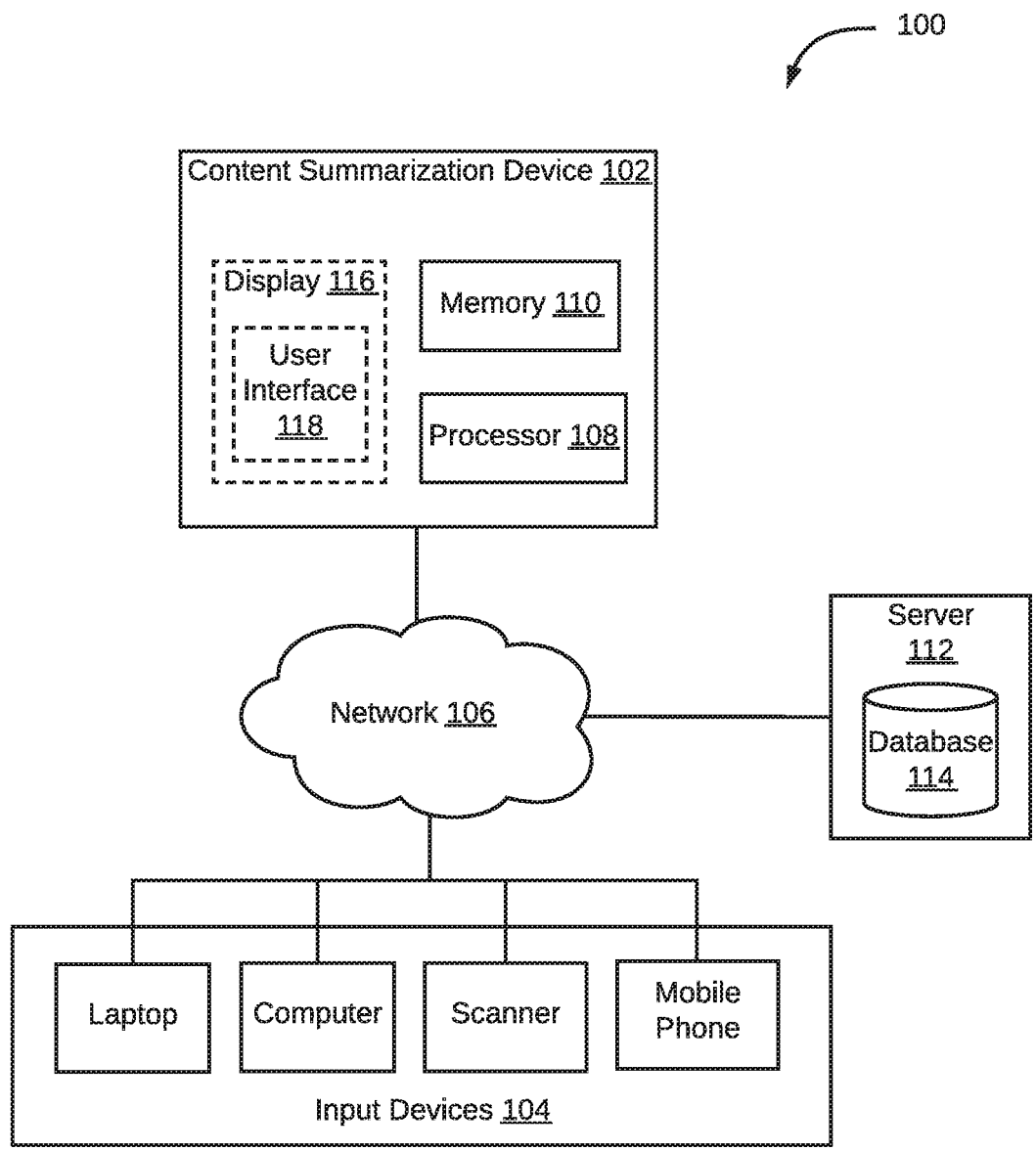
FIG. 1 illustrates a block diagram of a system for summarizing content based on user preferences, in accordance with an embodiment.

In one embodiment, a system 100 for summarizing content based on user preferences is illustrated in FIG. 1. The system 100 may include a content summarization device 102. The content summarization device 102 may have the processing capabilities to summarize content based on user preferences during file transfer. The content is summarized such that meaning of the content is retained. The content summarization device 102 may generate the summarized content of user interest from a plurality of sentences. The plurality of sentences may be generated from a document. The document may correspond to any multimedia data in which the user may be interested. The content summarization device 102 may allow flexibility to the user to generate and accommodate the summarized content based on his/her requirement. Examples of the content summarization device 102 may include, but are not limited to, a server, a desktop, a laptop, a notebook, a netbook, a tablet, a smartphone, and a mobile phone.

The content summarization device 102 may receive the user preferences from input devices 104. Examples of input devices 104 may include, but is not limited to a laptop, a desktop, a smartphone, and a tablet. The input devices 104 are communicatively coupled to the content summarization device 102, via a network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Once the user preferences corresponding to the document is received, the content summarization device 102 may extract a set of objects from the plurality of sentences. In an embodiment, the set of objects may be extracted by parsing the plurality of sentences corresponding to the document. Once the set of objects are extracted, the content summarization device 102 may identify a set of relevant objects from the set of objects. The set of relevant objects may be identified based on a relevancy score. Moreover, the plurality of sentences corresponding to the document may be extracted from a server 106 via the network 106. The server 106 may include a database 108 that may be updated periodically with a new set of relevant objects identified from a new set of sentences corresponding to a new document.

As will be described in greater detail in conjunction with FIG. 2 to FIG. 12 in order to generate the summarized content of user interest, the content summarization device 102 may include a processor 108 which may be communicatively coupled to a memory 110. The memory 110 may store processor instructions, which when executed by the processor 108 may cause the processor 108 to generate the summarized content. This is further explained in detail in conjunction with FIG. 2. The memory 110 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random-Access Memory (DRAM), and Static Random-Access memory (SRAM).

The content summarization device 102 may include a display 116 that may further include a user interface 118. A user or an administrator may interact with the content summarization device 102 and vice versa through the display 116. The display 116 may be used to display an intermediate result or a final result i.e., the summarized content, generated by the content summarization device 102. The user interface 118 may be used by the user to provide inputs on a degree of summarization required from a content of the document to the content summarization device 102.

Figure 2:
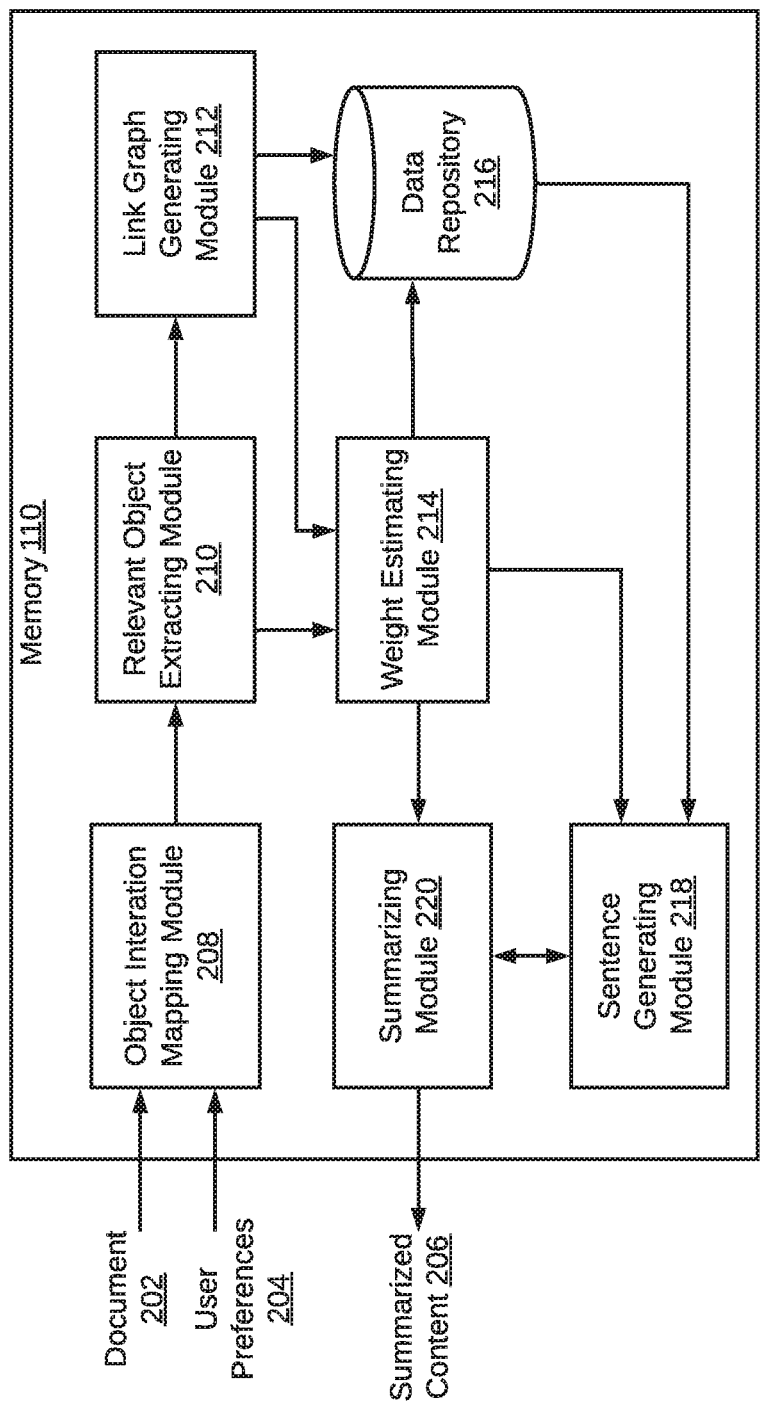
FIG. 2 illustrates a functional block diagram of various modules within a memory of a content summarization device configured to summarize content based on user preferences, in accordance with some embodiment.

Referring now to FIG. 2, a functional block diagram of various modules within the memory 110 of the content summarization device 102 configured to generate summarized content based on user preferences is illustrated, in accordance with an embodiment. As explained in conjunction with FIG. 1, the content summarization device 102 may generate the summarized content by identifying a set of relevant objects from a set of objects. The set of objects may be extracted from the plurality of sentences corresponding to a document. The memory 110 may include, an object interaction mapping module 208, a relevant object extracting module 210, a link graph generating module 212, a weight estimating module 214, a data repository 216, a sentence generating module 218, and a summarizing module 220. Moreover, the memory 110 may receive a document 202 and user preferences 204. In addition, the memory 110 may generate a summarized content 206 in response to receiving the document and user preferences. As will be appreciated by those skilled in the art, all such aforementioned modules 208-220 may be represented as a single module or a combination of different modules. Moreover, as will be appreciated by those skilled in the art, each of the modules 208-220 may reside, in whole or in parts, on one device or multiple devices in communication with each other.

In an embodiment, the document 202 may be received by the object interaction mapping module 208. The document may include one or more blocks of text that need to be summarized for the user. In an embodiment, the document may include, but is not limited to a text document, an audio file, and a video file. In case of the audio file, the document may be first converted into a text format. Moreover, in case of the document that includes a video file or an image file, the document may first undergo caption or scene description through text before generating the summarized content. The document may then be provided as an input to the object-interaction mapping module 208.

The user preferences 204 may refer to an input indicating the degree of summarization. The degree may refer to a percentage of summarization requested by the user. By way of an example, the degree of summarization may be 50% of the original content specified by the user. In an embodiment, a default value for the degree of summarization may be set to 0.5. It should be noted that, when the degree of summarization is less, most of the text in the document may retained as it is with less summarization. Moreover, in extreme cases, when the degree of summarization is 1, the complete text in the document may be considered for summarization. In an embodiment, the summarized content may include important sentences from a high priority to a low priority. In addition, based on the user preferences, a certain object or character may be omitted from the summarized content. The user preferences may then be provided as an input to the object interaction mapping module.

The summarized content 206 may be generated in response of processing done by various modules 208-220 of the memory 110. The summarized content 206 may be extracted from the document and may be rendered to the user. In an embodiment, the document may be summarized to the degree specified by the user. The summarized content 206 generated may correspond to a collection of related text maintaining smooth flow of information. A set of sentences may be removed from the original content of the document. The set of sentences may be removed in way such that a flow of the original content may not be affected. Moreover, an incremental process may be followed in order to generate the summarized content 206. Further, in order to obtain an updated summarization of the original content, a set of sentences already present in the summarized may not be removed. The summarized content 206 may then be rendered to the user via the display 116.

The object interaction mapping module 208 may be configured to receive the document that may be needed to be summarized. In addition, the object interaction mapping module 208 may also be configured to receive the user preferences as the input. Once the document may be received, the object interaction mapping module 208 may be configured to generate a table including all interacting objects in the document. Moreover, the object interaction mapping module 208 may also determine a nature of interaction existing between each object in the set of objects extracted from the document. Initially, the set of objects may be extracted from the plurality of sentences. In an embodiment, the set of objects may correspond to entities obtained by parsing the plurality of sentences comprising input text. Main functionality of the object interaction mapping module 208 may be in binding the entity named with other named entities. The object interaction mapping module 208 may then perform an action by linking the entities named with other entities in the document. However, there may be some sentences from the plurality of sentences for which only one named entity (also referred to as object) that may be associated with the named entities in the document. A relation identified between the entity with other entities in the document may be stored in a table. Further, the object interaction mapping module 208 may be configured to send the table generated based on the relations of the entity with other entities to the relevant object extracting module 210.

The relevant object-extracting module 210 may be configured to receive the table generated from the object interaction mapping module 208. The relevant object extracting module 210 may also be configured to recognize the set of objects that may be important based on a set of rules. The set of objects may be recognized in order to identify the set of relevant of objects for the table generated. Additionally, the set of rules may include, but is not limited to, the degree of occurrence of each of the set of objects within the document, the relation of the object to other objects, priority of the objects based on their occurrences, and a position of each of the set of objects in the document. It should be noted that, each of set the objects in the document may not be of equal importance. Therefore, some of the objects (for example, the set of relevant objects) from the set of objects may have higher priority or relevance than others. These objects having higher priority may be considered an important factor that needs to be considered during summarization.

Additionally, the relevant object extracting module 210 may be configured to discard objects with less relevance along with their interactions from the summarized content. Moreover, importance of each of the set of objects along with their interaction may be assigned by the relevant object extracting module 210. The importance of each of the set of objects may be based on a plurality of parameters. The plurality of parameters may include, but are not limited to, a type of interaction and a nature of interaction of each object within the set of objects. Moreover, some of additional parameters considered may include number of times the object is occurring during the interaction, context of the object, and a relevance of each of the set of objects. Further, the relevant object extracting module 210 may also be configured to send the set of relevant objects to a link graph generating module 212. In addition, the relevant object extracting 210 may send a frequency of each of the set of relevant objects along with the nature of interaction to a weight estimating module 214.

The link graph generating module 212 may be configured to receive the set of relevant objects from the relevant object extracting module 210. The link graph generating module 212 may also be configured to generate a link graph from the plurality of sentences and the set of objects. In an embodiment, the link graph may connect each of the plurality of sentences that include common objects in the set of objects. In an embodiment, the interaction of each of the set of objects may be linked to each other or depend upon each other. This may help to identify impact of deleting a set of sentences that include a certain object during the process of summarization. Moreover, the set of sentences may be removed in way such that the flow of the summarized content may be maintained. Additionally, it must be ensured that the objects interacting with each other in the set of objects do not appear suddenly in the summarized content without a quote on their first appearance in the text of the document.

Figure 9:
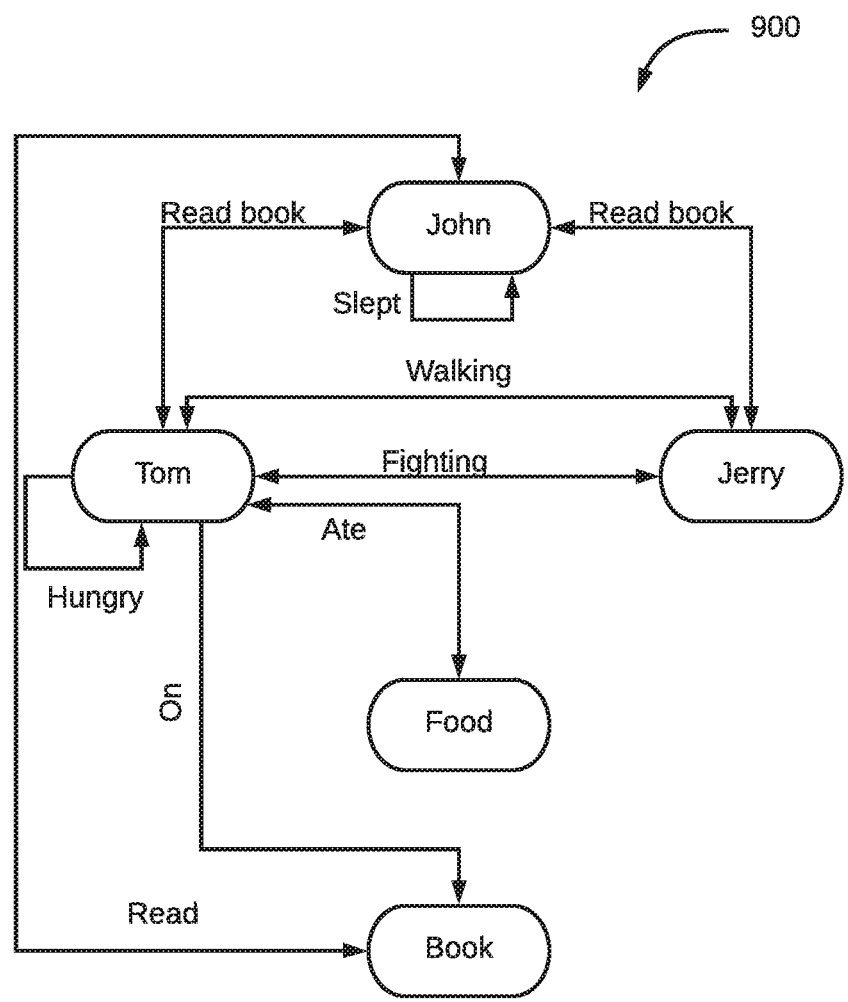
FIG. 9 illustrates a link graph generated based on a relevancy score corresponding to each of a set of objects, in accordance with an exemplary embodiment.
Figure 11:
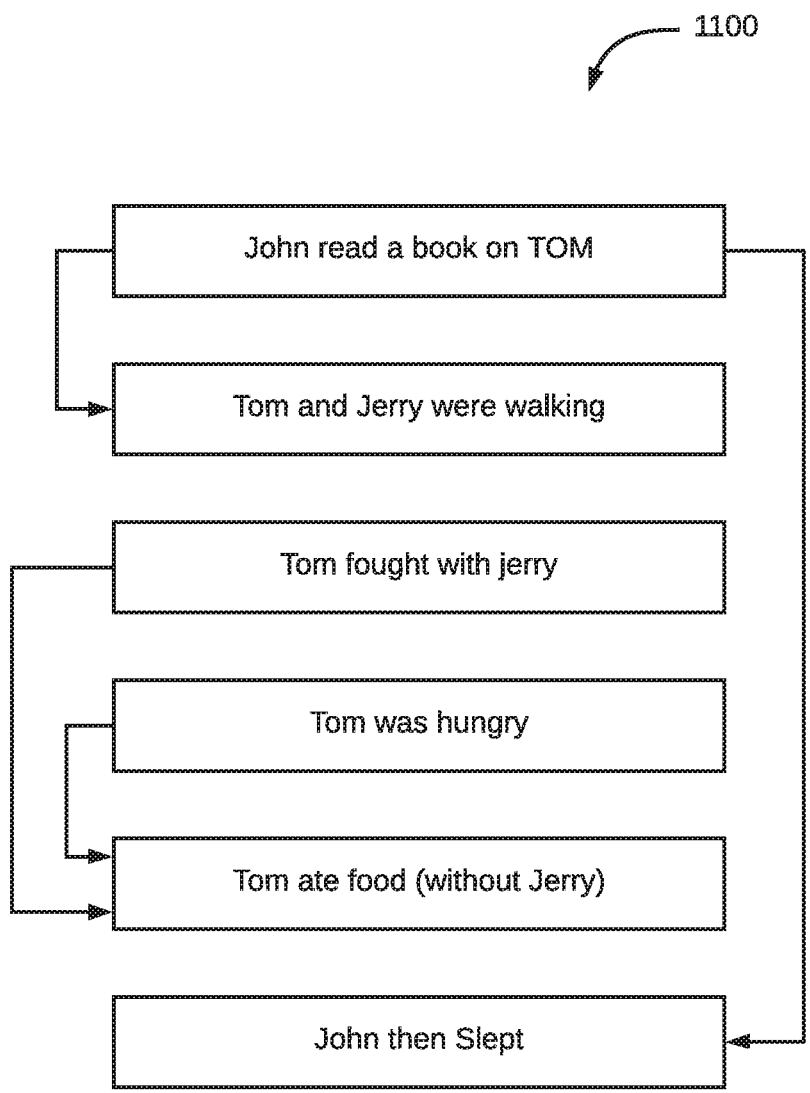
FIG. 11 represents a link graph generated for a plurality of sentences, in accordance with an exemplary embodiment.

As will be appreciated, the objects may be omitted without a break such that the flow of the understanding may be easily identified. Moreover, the objects may be omitted in way such that there would be no further sentences in the summarized content depending upon the set of objects omitted. The objects that do not interact or perform any actions may be safely omitted from the set of objects. The objects omitted may be treated as an out of context object. It should be noted that, understanding of a particular sentence may require a presence of certain previous sentence in the flow, i.e., all the sentences from the plurality of sentences of the document may not be independent and unrelated sentences. In an embodiment, dependency among each of the plurality of sentences may be depicted through arrows by way of a link graph (as depicted in FIG. 9 and FIG. 11). Moreover, when the arrow enters a sentence, it cannot be comprehended without the availability of the sentence from where the arrow originates. However, the converse is not true, i.e., the sentence where the arrow ends may be omitted without affecting the flow of the summarized content, as long as the sentences from where the arrow originated are maintained in the summarized content. Thereafter, the link graph generating module 214 may send and store the sentences linked along with their weights in the data repository 216. Further, the link graph generating module 216 may send the linked sentences to the weight estimating module 214.

The weight estimating module 214 may be configured to receive the frequency of each of the set of relevant objects along with the nature of interactions from the relevant object extracting module 212. The weight estimating module 214 may also be configured to receive the sentences linked from the link graph generating module 212. Further, the weight estimating module 214 may be configured to estimate a weight of the each of the plurality of sentences extracted from the document. The weight may be computed based on a plurality of parameters, that may include but are not limited to, a number of arrows leaving the sentence in a sentence graph, and a number of links in the link graph based on the objects in each of the plurality of sentences. In an embodiment, the sentences from the plurality of sentences with high weightage may be retained in order to generate the summarized content. Accordingly, based on the user preferences for the degree of summarization, the sentences may be selected such that a sum of relative weightages (obtained by normalizing with total weight of all sentences) of the sentences considered may be equal to the degree of summarization sought by the user. Moreover, the sentences may be considered in a decreasing order of weight for generating the summarized content. Further, the weight estimating module 214 may be configured to send the weights to the summarizing module 220. The weight estimating module 214 may store all data including the sentences, the link graphs, and the weight associated to each of the plurality of sentences in the data repository 216. In addition, the weight estimating module 214 may also send the data to the sentence generating module 218.

The data repository 216 may receive and store the data including the sentences, the link graphs, and the weight associated to each of the plurality of sentences from the weight estimating module 214. The data repository 216 may also receive and store the sentences linked along with the weights from the link graph generating module 212 for further processing. Moreover, the intermediate summarized content may be also stored in the data repository 216. The data repository 216 may not support queries related to the user. However, the data repository 216 may be fast enough to provide the tables or the link graphs required to other corresponding modules within the memory 110. It should be noted that, the user may typically expect the summarized content of different degree in real time. Therefore, a no SQL data repository or RADIUS may be considered for generating the summarized content. Thereafter, the data repository 216 may send the data to the sentence generating module 218.

The sentence generating module 218 may include a bidirectional Long Short-Term Memory (LSTM) to generate sentences with smooth transition for improved readability considering anaphora resolution. The smooth transition may be generated such that the desired degree of summarization may be maintained. The sentence generating module 218 may be configured to obtain the content to be summarized from the data repository 216. The sentence generating module 218 may also be configured to obtain a summarization plan, i.e., the weight corresponding to each of the plurality of sentences from the summarizing module 220. Moreover, the sentence generating module 218 may be configured to receive the data from the weight estimating module 214. It should be noted that, lacuna created by discarding the set of sentences from the plurality of sentences may be smoothly filled during summarization while considering articles, pronouns (for example, he/she) and the references (for example, "there"). Moreover, the LSTM may replace the references, such as, 'there' by the names of the entities based on historical data collected over a few sentences extracted from previous documents. Once the plurality of sentences along with the link graph and the associated weight are received from the weight estimating module 214, the sentence generating module 218 may consider a set of sentences for generating the summarized content 206 considering anaphora resolution and rules of summarization.

The set of sentences generated may be sent to the summarizing module 220 for controlled compression based on the user preferences received initially. Thereafter, the desired degree of summarization by the user may be applied to the set of sentences considered for generating the summarized content 206. In addition, each of the set of sentences may be processed by the summarizing module 220 in order to generate the compressed summarized content 206. The compressed summarized content 206 may be generated such that the flow of the summarized content 206 may be smooth with anaphora resolution. Moreover, all the rules of summarization may be considered in order to generate a meaningful summarized content in compressed format.

The summarizing module 220 may be configured to receive the weights from the weight estimating module 214. The summarizing module 220 may also be configured to control the degree of summarization considering dependency of each of the plurality of sentences. The dependency may be considered in order to maintain the smooth flow and good understanding of the summarized content. In an embodiment, the degree of summarization represents reduction of text in the original document by retaining important sentences along with the flow of the content of the document. Further, the summarizing module 220 may be configured to send the weights as blueprint to the sentence generating module 218. The summarizing module 220 may organizes each of the plurality of sentence in descending order of importance or the weight. Thereafter, the generated summarized content 206 may be rendered to the user.

Figure 3:
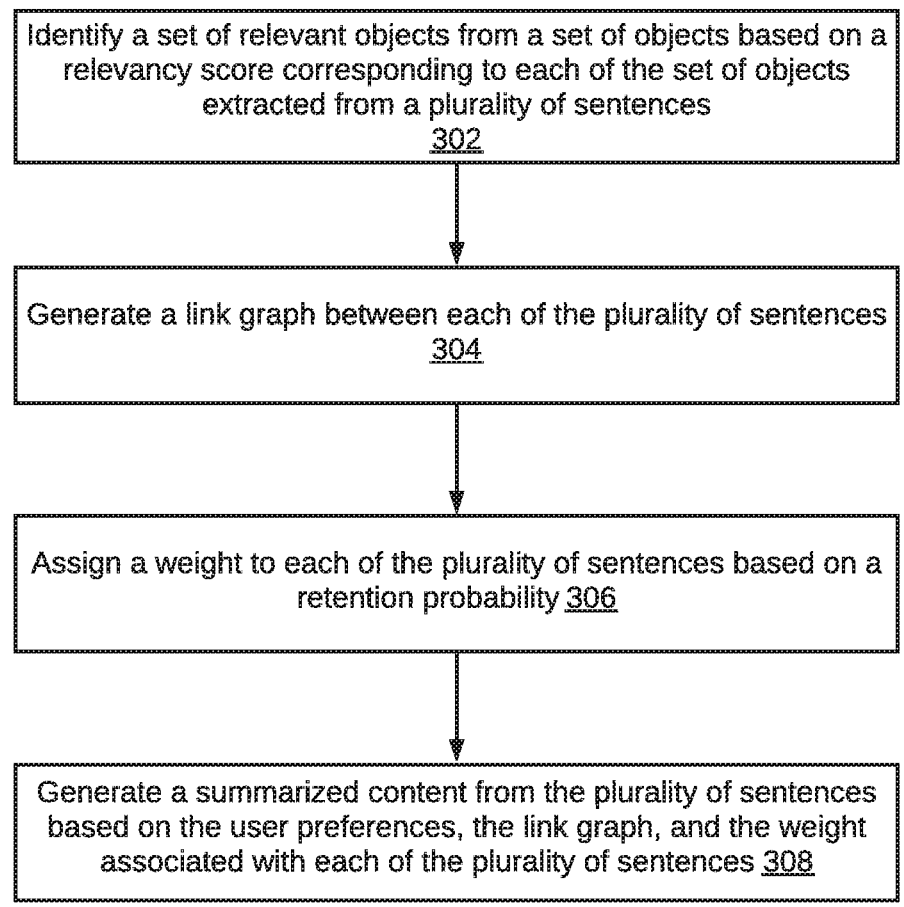
FIG. 3 illustrates a flowchart of a method for summarizing content based on user preferences, in accordance with an embodiment.

Referring now to FIG. 3, a flowchart of a method for summarizing content based on user preferences is illustrated, in accordance with an embodiment. At step 302, the set of relevant objects may be identified from the set of objects based on a relevancy score corresponding to each of the set of objects. The set of objects may be extracted from the plurality of sentences corresponding to the document. The relevancy score for each of the set of objects may be determined based on an associated attention score, probability score, and domain score. In addition, the plurality of sentences may be retrieved from the content of the document. The set of objects in the content of the document may be identified along with the nature of the interaction. The set of objects may be identified based on a Natural Language Toolkit (NLTK) library. The NLTK library may supports breaking of each of the plurality of sentences into a part of speech (POS). The NLTK library (for example, POS tagging) may receive and segment each of the plurality of sentences into the POS. Thereafter, based on the segmentation of each of the plurality of sentences, a list may be generated such that the set of objects (referred as subject), an interacting objects (referred to as predicate), and the nature of interactions (referred as verb/adverb) may be derived.

It should be noted that, remaining POS may generally map to one of the set of objects, the interacting objects, and the nature of interactions. Further, the objects may be marked with attention score for further processing and may be stored in an interaction table. By way of an example, consider a sentence "Tom is beating Jerry." In this sentence, the attention may refer to the relationship of object/s with respect to others (implicit relation), existence of the object (independent or relative), and importance of object (very important, important, and regular). Similarly, each of the set of objects along with the object interaction may be assigned with the attention score. The interaction table is further explained in detail in conjunction with an exemplary embodiment of FIG. 6.

Each of the set of objects may be differentiated into more relevant objects and less relevant objects based on the relevancy score. The relevancy score for each of the set of objects is determined based on an associated attention score, probability score (i.e., number of times each object appear), and domain score. The relevancy score may be determined based on an equation 1 mentioned below:

$$\text{Relevance Score} = \text{Attention Score} + \text{Probability Score} + \text{Generic Domain Score} \quad (1)$$

The Generic Domain Score of equation (1) may be determined from a GenericDomainScore( ) Application Programming Interface (API). A method to determine the GenericDomainScore( ) API is further explained in detail in conjunction with FIG. 7. The attention score may correspond to a pre-defined value. The probability score may correspond to a ratio count of each of the set of objects in the given document to total number of objects in the document. By way of an example, actions such as fighting and beating may have high precedence over the actions such as reading, eating, and thinking. This may be because, an impact of the actions such as fighting and beating may be seen further in the content, i.e., the fighting may have the impact further while thinking may not likely impact the further context.

Moreover, precedence of each of the set of objects and the actions (i.e., the nature of interaction) may be obtained from the interaction table. The interaction table may be available in the data repository 216. The interaction table stored in the data repository 216 may be generated based on huge input corpus. In addition, the action associated with each of the set of objects may provide the precedence in the interaction table. Further, the relevant object-extracting module 210 may run through entire input corpus for identifying the frequency of each of the set of objects and their corresponding relevance. The important actions may be listed in a different table along with their relevance and this table may be maintained in the data repository 216. It should be noted that, the interaction table may correspond to a pre-generated table that may be generated based on the huge corpus containing documents from all domain categories.

At step 304, the link graph may be generated between each of the plurality of sentences. Moreover, the link graph may be generated based on the relevancy score corresponding to each of the plurality of sentences. In an embodiment, each of the plurality of sentences that may be related with each other are linked together. In addition, the sentences spanning each of the set of relevant objects may be connected together with a stronger link. The links and the relevance corresponding to each of the set of objects may be stored in a link table by the link graph generating module 210. Once the link graph is generated, at step 306, the weight may be assigned to each of the plurality of sentences based on a retention probability. The retention probability may be determined based on a position of a sentence in flow among the plurality of sentences and an interaction of the sentence with remaining sentences in the plurality of sentences. Moreover, each of the plurality of sentences may be grouped for different degrees of summarization. In order to generate the summarized content some sentences from the plurality of sentences may need to be discarded. The discarding may happen according to a couple of rules (i.e., the retention probability) based on which the weight may be assigned to each of the plurality of sentence.

At step 308, the summarized content may be generated from the plurality of sentences based on the user preferences, the link graph, and the weight associated with each of the plurality of sentences. In order to generate the summarized content, the bidirectional LSTM mechanism may be used. The summarized content may be generated by smoothing abrupt transition in each of the plurality of sentences. In an embodiment, each of the plurality of sentences may be concatenated with probabilities (i.e. the weights derived for each of the plurality of sentences). It should be noted that, an Artificial Intelligence (AI) model may be trained to provide right sentences based on the link graph generated. The AI model may learn the rules for discarding unrelated sentences or less weightage sentences and objects (as well as actions) for the degree of summarization specified by the user. In an embodiment, the AI model trained may correspond to the LSTM model. Moreover, for training the LSTM model, a forward and a backward LSTM model may be provided with the plurality of sentences from forward and backward directions along with the associated weights.

Figure 4:
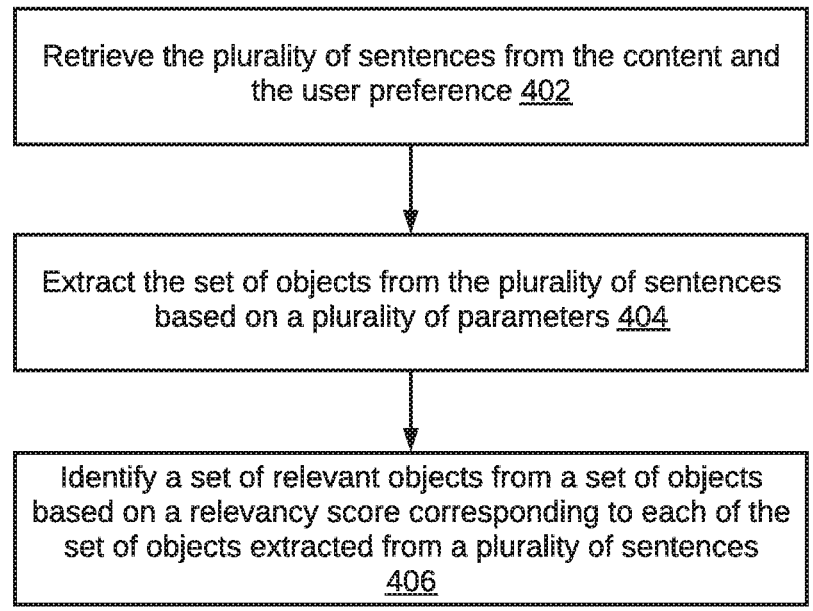
FIG. 4 illustrates a flowchart of a method for identifying a set of relevant objects corresponding to each of a set of objects extracted from a plurality of sentences, in accordance with an exemplary embodiment.
Figure 5:
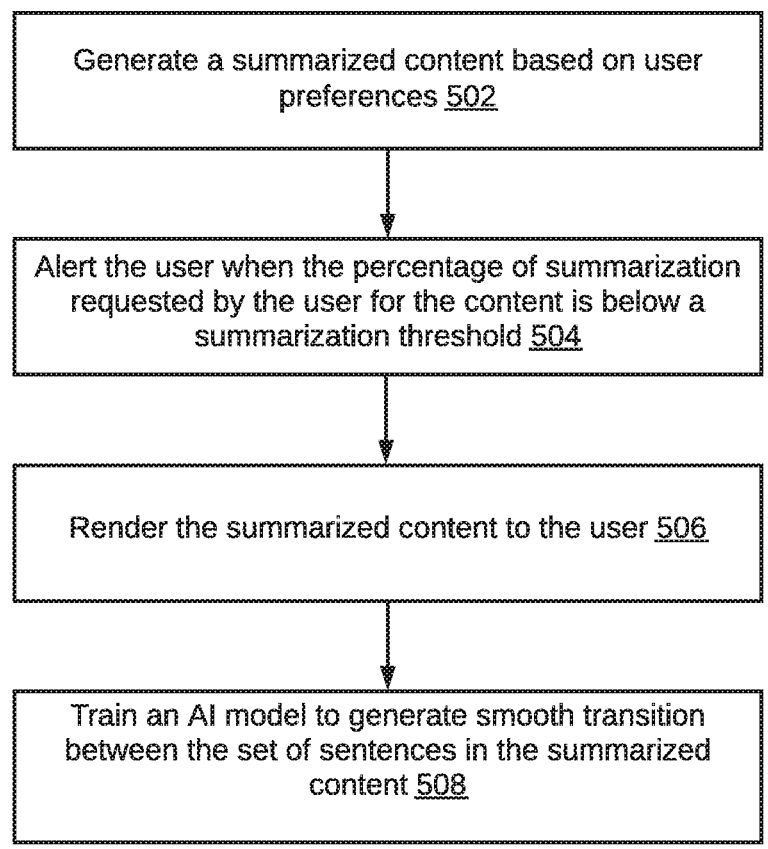
FIG. 5 illustrates a flowchart of a method for training an Artificial Intelligence (AI) model for generating smooth transition between a set of sentences in a summarized content, in accordance with an embodiment.

Referring now to FIG. 4, a flowchart of a method for identifying a set of relevant objects corresponding to each of a set of objects extracted from a plurality of sentences is illustrated, in accordance with an embodiment. At step 402, the plurality of sentences may be retrieved from the content of the document. The user preferences may also be retrieved along with the plurality of sentences. At step 404, the set of objects may be extracted from each of the plurality of sentences. The set of objects may be extracted based on a plurality of parameters. The plurality of parameters may include, but are not limited to a type of interaction and a nature of interaction of each object within the set of objects. In an embodiment, the set of objects may be extracted by segmenting each of the plurality of sentences into POS.

Once the set of objects are extracted, at step 406, the set of relevant objects may be identified based on the relevancy score corresponding to each of the set of objects. The relevancy score for each of the set of objects may be determined based on an associated attention score, probability score, and domain score Referring now to FIG. 5, a flowchart of a method for training AI model for generating smooth transition between a set of sentences in a summarized content is illustrated, in accordance with an embodiment. At step 502, the summarized content may be generated based on user preferences. The user preferences may include a percentage of summarization requested by the user for the content. The percentage of summarization may also be referred as the degree of summarization. At step 504, the user may be alerted when the percentage of summarization requested by the user for the content may be below a summarization threshold. By way of an example, the percentage of summarization requested may provide a summarization of the content with total weightage less than the summarization threshold. By way of an example, the summarization threshold may be 20%. Once it is identified that the percentage of the summarization of the content is below 20%, the user may be alerted regarding the same.

At step 506, the summarized content generated based on the user preferences may be rendered to the user. The summarized content may include a set of sentences extracted from a plurality of sentence based on the user preference. In an embodiment, the set of sentences may be extracted by removing sentences from the plurality of sentences (considered from an end of document) that may not have an arrow emanating from them or arrow hitting them (extracted from a link graph as depicted in FIG. 9 and FIG. 11). Although, the sentences that do not have an arrow emanating for them may be deleted, a result that includes the summarized content may not be properly generated. In order to generate the summarized content, the bidirectional LSTM model may be used. The bidirectional LSTM model may handle other similar scenarios and sequence of removal of the sentences from the plurality of sentences. Moreover, the bidirectional LSTM model may consider the weight along with number of arrows leaving or entering corresponding to each of the plurality of sentences.

In an embodiment, a single probability that may be arrived may correspond to each of the plurality of sentences considering the arrows by adding the weight of connecting sentences from the plurality of sentences. By way of example, when a total weight considering each of the plurality of sentences may be 100, then the degree of summarization may be directly mapped with sum of the weights of the set of sentences retained. In an embodiment, object wise summarization may be performed. In object wise summarization, the paths spanned by an object may be retained, thereby resulting in a minimal or no summarization of the content. The object may be specified by the user. Additionally, in object wise summarization, some links may be deleted while retaining more links around the object of interest. In another embodiment, truncated summarization may be performed. In truncated summarization the summarization of the content may start after some point. In truncated summarization, in order to generate the summarized content with more details, the arrows hitting towards each of the plurality of sentences may be retained. It should be noted that, the sentences that may receive less arrows may have low priority. At step 508, the AI model may be trained in order to generate smooth transition between the set of sentences of the summarized content. In an embodiment, the AI model considered may correspond to the bidirectional LSTM model.

Figure 6:
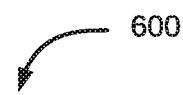
FIG. 6 illustrates a table mapping a set of objects with their respective nature of interaction, in accordance with an exemplary embodiment.

Referring now to FIG. 6, a table 600 mapping a set of objects with their respective nature of interaction is illustrated, in accordance with an exemplary embodiment. The table 600 may be generate based on a list of sentences. The list of sentences may include a list (1) depicted below:

List (1)
John read a book on Tom
Tom and Jerry were walking
Tom fought with Jerry
Tom was hungry
Tom ate food (without Jerry)
John then slept The table 600 may include a column each for reference objects 602, interacting objects 604, nature of interaction 606, attention 608, and attention objects 610. The table 600 may be generated by parsing each of the sentence in the list. In addition, the table 600 may represent the set of objects to be considered for identifying a set of relevant of objects. Moreover, repetitions may be encountered in entry of the table 600 as same interaction corresponding to each of the set of objects or its reciprocal may be encountered in next time instance.

Referring now to FIG. 7, a table representing a domain score, a relevancy score and a frequency score corresponding to each of a set of objects is illustrated, in accordance with an exemplary embodiment. A table 700a may include the following columns: an object/action 702, a domain or category 704, a context 706, and an importance or relevance 708. In an exemplary embodiment, the scoring as given in the column for importance or relevance 708 may be interpreted as follows: Very important=100, Important=80, Related=60, Independent=0, Implicit=20, and normal=40.

The columns of the table 700a may help in determining the domain score and the relevancy score of a new set of objects extracted from the plurality of sentences. In addition, the table 700a may represent a pre-generated table that may be generated from the huge corpus of documents from all categories. The table 700a may be populated with each object and action in the huge corpus. The relevance score may be calculated based on the frequency of occurrence of the object and the impact of the object in the domain or category 704. In an embodiment, an API may take as an 'the domain or category 704', 'the context 706' and 'the object/action 702' as an input and may provide the corresponding relevance score.

A table 700b may represent columns comprising object/actions 702b, frequency 704b, and relevance 706c. The table 700b may be generated for the plurality of sentences depicted in a list (2) and a list (3).

List (2)
John read a book on Smith.
Smith thought about giving a gift to David.
He went to shop in the market.
He slipped due to watery road.
In the shop, he wanted to decide between Buddha statue and Ganesh statue.
He decided to give Buddha statue to David.
Smith and David fought and became friends again.
John then slept.
List (3)
John read a book on Steve.
Steve thought to do bad to Louis.
Steve fought with Louis for a book.
Louis started to hate Steve.

Steve wanted to gift Louis to become friends.
He went to shop in the market to buy a gift.
Steve gave a gift to Louis and became friends again.
John then slept.

By way of an example, in the list 2 as depicted above, let us assume the domain score of 20 may be provided to an object "Fought", with the domain 'general' and the context as 'fighting' on providing the object "Fought" to the GenericDomainScore API. In addition, for the object "Thought", with the domain 'general' and the context as 'fighting' the GenericDomainScore API may provide a score less than 20. Let us assume the GenericDomainScore API may provide a score of 5 to the object "Thought," since in the list (2), "fought" may have higher impact when compared to attention object "thought". Similarly, for the list (3), the GenericDomainScore ('general', 'doing-bad', 'fought') may be provided less score as compared to the GenericDomainScore ('general', 'doing-bad', 'thought') because "thought" has higher impact compared to "fought." Moreover, the objects "thought" and "fought" when passed to the GenericDomainScore ( ) API, may return scores with minimum difference since their impact is almost equal in the context.

By way of an example, the relevance score for an object "John" may be calculated as shown by equation (2) below:

$$\text{Relevance score for John} = \text{Attention Score (very important)} + 2 \text{ (frequency of John)} + \text{Generic Domain Score for John} \quad (2)$$

In an embodiment, the frequency may correspond to probability score. Since, the object "John" is noun and is the name of a person. Therefore, the object "John" may have low Generic Domain Score. The attention score may be enumerated based on priority of type of attention. The type of attention may be predefined as listed below:

Very Important=100
Important=80
Related=60
Independent=0
Implicit=20
Normal=40

Further, the relevance score for the object "John" may be 100+2+10 (112). The relevance score for the object "Tom" may be 80+5+10 (95). Moreover, since "Tom" and "Jerry" are connected by "Implicit" attention type, the relevance score of Jerry may be 80+2+10 (92). Further, removing a sentence with highly relevant object in beginning of the document may likely affect the flow of the document. Hence, making it difficult to comprehend the document.

In addition, threshold may be set for the frequency of the objects in the table 700b that may need to be called as more relevant. In an embodiment, an absolute value for the threshold may be selected. By way of an example, any object appearing less than 10 times may be discarded during summarization. In another embodiment, 10 most frequently occurring objects may be selected. In yet another embodiment, 40% objects may be selected. Moreover, a vocabulary may be maintained for important objects and actions. By way of an example, the Generic Domain Score API may be used on the vocabulary corresponding to important objects and actions. Moreover, when the action may fall within limit, a weight, say, 60 may be assigned to the object as well as the sentence. Otherwise, a weightage of 40 may be assigned.

Figure 8:
FIG. 8 illustrates a link table generated based on a link graph corresponding to each of a set of objects, in accordance with an exemplary embodiment.

Referring now to FIG. 8, a link table 800 is generated based on a link graph corresponding to each of a set of objects is illustrated, in accordance with an exemplary embodiment. In reference to FIG. 7, the link table 800 may include columns that include ID 802, link 804, object/actions 702b, frequency 704b, and relevance 706. The link table 800 may be used to generate the link graph. The link table 800 may be used to generate the meaningful summarized content. By way of an example, some of the meaningful summarized content generated may be represented below via a list 4, a list 5, a list 6, and a list 7.

List 4:
Tom and Jerry were walking
Tom fought with Jerry
Tom was hungry
Tom ate food (without Jerry)

List 5:
John read a book on Tom
Tom and Jerry were walking
Tom fought with Jerry
Tom was hungry
Tom ate food (without Jerry)

List 6:
John read a book on Tom
Tom fought with Jerry
Tom was hungry
Tom ate food (without Jerry)
John then slept List 7:
John read a book on Tom
John then slept By way of another example, some of the bad summarized content that may be generated without the link table 800 using any other mechanism may be represented via a list 8, and a list 9.

List 8:
Tom fought with Jerry
Tom was hungry
Tom ate food (without Jerry)
John then slept List 9:
John then slept Moreover, it may be noticed that the object "Tom" may correspond to a critical object. Therefore, if the object "Tom" may be removed, the summarized content may end up as represented by the list 9.

Referring now to FIG. 9, a link graph 900 generated based on a relevancy score corresponding to each of a set of objects is illustrated, in accordance with an exemplary embodiment. With reference to exemplary embodiments explained in FIG. 8, the link graph 900 may be generated based of the relevancy score corresponding to each of the set of objects. In addition, the link graph 900 may be generated using the link table 800. As represented in the link graph 900, the object "Tom" may have a highest priority. Similarly, the action "fighting" may have the highest priority. The arrow lines between the objects may have different relevancy score. The arrow lines may be generated based on the link table 800. The link table 800, may be used to derive the action with highest relevancy score, i.e., "fighting." The arrows other than one connection, i.e., the action "fighting," may have less relevancy score.

Referring now to FIG. 10, a table 1000 depicting a weight assigned to each of a plurality of sentences is illustrated, in accordance with an exemplary embodiment. The table 1000 may be used to determine the weight corresponding to each of the plurality of sentences. By way of an example, "John read a book on Tom," where John interacts with the object "book" may appear only single time in the document. Whereas, the object "Tom" may appears four times in the document. Therefore, the weight corresponding to the sentence "John read a book on Tom" may be determined as 1+1*4=5. In a similar way, the weight of the object "book" may be determined. The object "book" may interact with John that may appear 2 times in the document. In addition, the object "book" may interact with Tom that may appear 6 times. Therefore, the weight corresponding to the object "book" may be 6. Moreover, although the object "book" may appear once, it may be required to retain first sentence, if the last sentence has to be retained.

It must be noted that, when a named entity does not interact with any other named entity, it may be discarded without affecting the flow of future sentences from that point onwards. By way of an example, a statement "there was a restaurant near by" and the restaurant may exist in a middle of the content of the document. This statement "there was a restaurant near by" and the restaurant (or its services) are not referenced subsequently. Thus, these may be easily discarded during summarization.

Consider a sentence comprising "John ate a pizza." If John appears again, a pre-condition that John ate pizza may always be associated with John. By way of an example, after some sentences, there may be a sentence "John paid the bill." If "John ate pizza" is not included, and only "John paid the bill" is included, then the summarized content may not be complete. In addition, the retention probability may increase if John makes any further interactions. The retention probability may help to retain a sentence if its impact (i.e., the effect of interaction) may not be used or evident in a future sentence. Therefore, the retention probabilities may be computed by considering other sentences ahead of that sentence. Hence, the retention probability may also be referred as forward retention probability. Moreover, if there is no sentence mentioning John or pizza, a very low retention probability may be assigned. The sentence with very low retention probability may be discarded without affecting the flow of rest of the content. Additionally, when the object (also referred as entity) interacts with another entity, the weight may be computed and added in a way described above.

By way of an example, consider a sentence "Tom and jerry ate pizza and drunk coke." The sentence "Tom and jerry ate pizza and drunk coke" may be segmented in a way represented below:

Tom ate pizza and
Tom drank coke
Jerry ate pizza
Jerry drunk coke

The weight may now be computed and added for each of the segments of the sentences. Moreover, each of the segments may be considered as a separate sentence. In addition, references of Tom, jerry, pizza and coke may be separately searched in subsequent part of the content of the document along with impact of the interaction assessed.

Referring now to FIG. 11, a link graph 1100 generated for a plurality of sentences is represented, in accordance with an exemplary embodiment. The link graph 1100 connecting the plurality of sentences may be represented in FIG. 11. The link graph 1100 may also be referred to as a sentence link graph. The link graph 1100 may represents arrows connecting on or more of the plurality of sentences. The link graph 1100 may be generated based on the retention probability along with the associated weight. In addition, the link graph 1100 may generate the summarized content from the plurality of sentences. In the link graph 1100, the sentence "john ate pizza" may be linked to "John paid the money" through a forward arrow. Moreover, the sentence may include terminating arrow for one or more sentences before that sentence in the flow. It should be noted that, the sentence may correspond to an outcome of a certain interaction happening in past (i.e., sentences occurring before). In order to generate the summarized content with better understanding, the sentences that may correspond to the outcome must be retained. Moreover, the flow of the summarized content may be maintained when there may be no cuts in the flow of the arrows. The weight and a reverse retention weight may be computed when the content above the sentence may exactly be the same.

Figure 12:
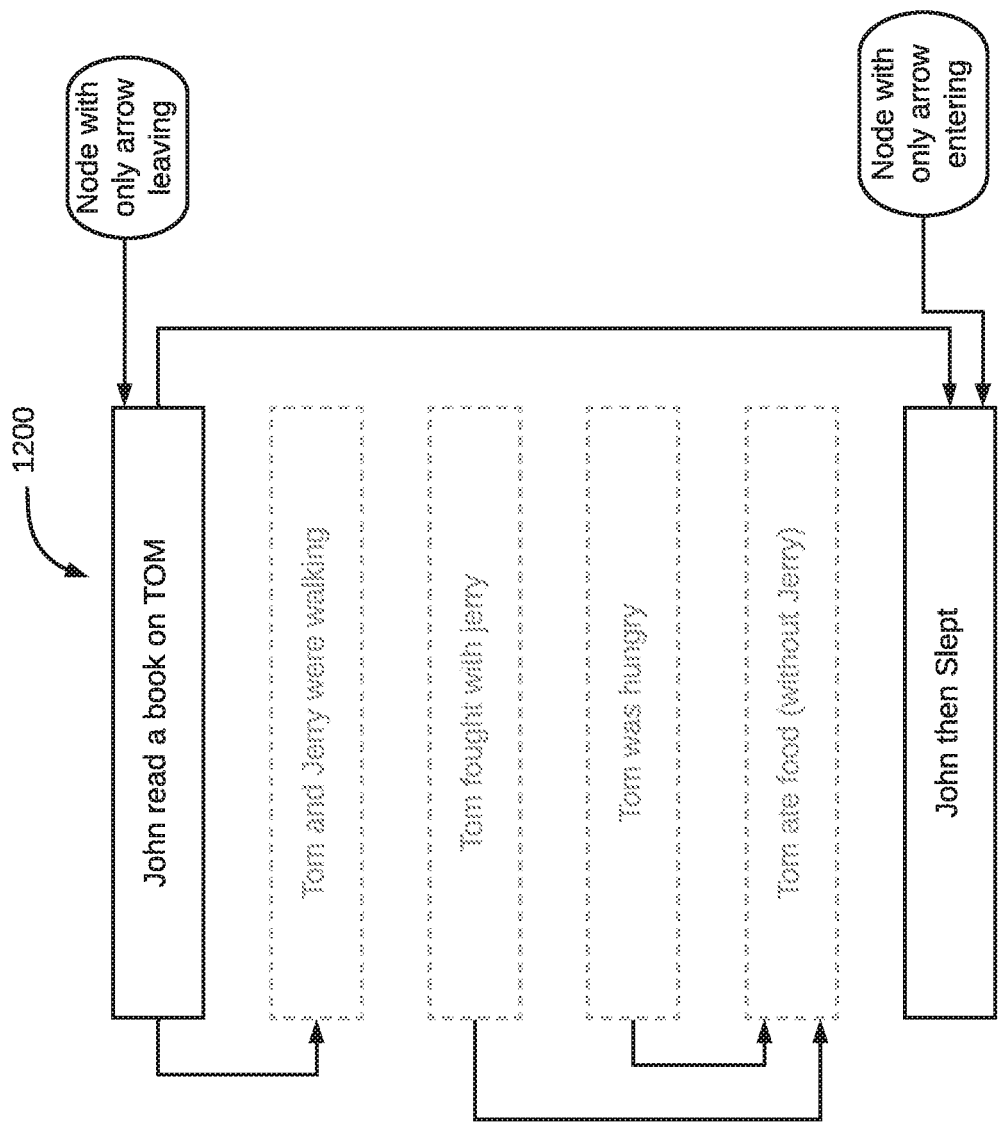
FIG. 12 represents a sub graph of a link graph generated for a plurality of sentences, in accordance with an exemplary embodiment.

Referring now to FIG. 12, a sub graph 1200 of the link graph 1100 generated for a plurality of sentences is represented, in accordance with an exemplary embodiment. The sub-graph 1200 may generated by removing the set of sentences from the plurality of sentences. The sub-graph 1200 may generate the meaningful summarized content. In an embodiment, the sub-graph 1200 may lead to a meaningful summarized content generated for the list 5 described in FIG. 7. Each sentence in the plurality of sentences may span one or more distinct arrow paths. The distinct arrow path corresponding to the plurality of sentences may be separated out and may eventually be removed. Moreover, the distinct arrows may be removed from bottom node of the document. The node may include each of the plurality of sentences. The link graph 1100 may be traversed from bottom towards top such that there may not be any arrow leaving the node from where there is no arrow entering. Once the link graph 1100 is traversed, the sub-graph (tree) 1200 of the link graph 1100 may be generated by spanning sentences related with each other.

By way of an example, consider a scenario where the user may be sharing a video with other users. John may be watching a movie on a high-end mobile device. After watching movie, John may find that the movie may have few details about a common work, that he and his friend Smith may be involved in. Thereafter, John may discuss with Smith and may decide to share the movie file with him. However, the mobile device owned by Smith may have low bandwidth and limited resources. In addition, Smith may find that frames of the movie file often freeze (as his device may be downloading the movie file slowly). Smith may find it very annoying and may opt for partial compression and summary streaming of the movie file, provided by a server that may implement the content summarization device 102. Subsequently, Smith may receive seamless experience of transferring the content of the movie file. Thereafter, Smith may watch the movie and may receive details that John may have intended to convey him through the movie for their progress in common work.

By way of another example, David (user) may be reading a novel online. He may have almost read about 100 pages of the novel. In order to read 100 pages, David may have taken 2 hours for that. Now, he may have yet another 100 pages to read that may likely take 2 more hours. However, David wants to complete the reading within one hour as he may be running short of time for his personal work. In order to save his time, David may invoke an application that may implement the proposed method. In that application, David may specify that the content between pages 101 to 200 of the novel needs to be summarized by about 50%. As a result, it may take David one hour to read the summarized content, instead of 2 hours.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for summarizing content based on user preferences. The method and system may identify a set of relevant objects from a set of objects based on a relevancy score corresponding to each of the set of objects extracted from a plurality of sentences. The method and system may then generate a link graph between each of the plurality of sentences. Further, the method and system may assign a weight to each of the plurality of sentences based on a retention probability. Thereafter, the method and system may generate a summarized content from the plurality of sentences based on the user preferences, the link graph, and the weight associated with each of the plurality of sentences.

The benefit of the claimed limitations is that, the present invention may dynamically change the degree of summarization and compression based on user requirements. The claimed limitations may also help in controlling the summarization and compression of any character or object in the document. Moreover, the claimed limitations may support truncated summarization. Additionally, the claimed limitations may summarize the content across documents effectively based on commonalities. Furthermore, the claimed limitations disclosed may start summarization of the content from any point and end at any point in the document.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for summarizing content based on user preferences. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for summarizing content based on user preferences, the method comprising:
    identifying, by a content summarization device, a set of relevant objects from a set of objects based on a relevancy score corresponding to each of the set of objects extracted from a plurality of sentences, wherein the relevancy score for each of the set of objects is determined based on an associated attention score, probability score, and domain score, and wherein the plurality of sentences are retrieved from the content;
    generating, by the content summarization device, a link graph between each of the plurality of sentences, wherein the link graph is generated based on the relevancy score determined for each of the set of objects;
    assigning, by the content summarization device, a weight to each of the plurality of sentences based on a retention probability, wherein the retention probability is determined based on a position of a sentence in flow among the plurality of sentences and an interaction of the sentence with remaining sentences in the plurality of sentences;
    generating, by the content summarization device, a summarized content from the plurality of sentences based on the user preferences, the link graph, and the weight associated with each of the plurality of sentences, wherein the user preferences comprise a percentage of summarization requested by a user for the content; and
    alerting, by the content summarization device, the user when the percentage of summarization requested by the user for the content is below a summarization threshold.

2. The method of claim 1, wherein identifying the set of relevant objects comprises:
    retrieving the plurality of sentences from the content and the user preference; and
    extracting the set of objects from the plurality of sentences based on a plurality of parameters, wherein the plurality of parameters comprise a type of interaction and a nature of interaction of each object within the set of objects.

3. The method of claim 2, wherein the set of objects are extracted by segmenting each of the plurality of sentences into part of speech using a Natural Language Toolkit (NLTK) mechanism.

4. The method of claim 1, wherein the relevancy score for each object in the set of relevant objects is above a predefined relevancy threshold.

5. The method of claim 1, further comprising rendering the summarized content to the user, wherein the summarized content comprises a set of sentences extracted from a plurality of sentence based on the user preference.

6. The method of claim 5, further comprising training an AI model to generate smooth transition between the set of sentences in the summarized content.

7. A system for summarizing content based on user preferences, the system comprising:
- a processor; and
- a memory communicatively coupled to the processor, wherein the memory stores processor instructions, which, on execution, causes the processor to:
- identify a set of relevant objects from a set of objects based on a relevancy score corresponding to each of the set of objects extracted from a plurality of sentences, wherein the relevancy score for each of the set of objects is determined based on an associated attention score, probability score, and domain score, and wherein the plurality of sentences are retrieved from the content;
- generate a link graph between each of the plurality of sentences, wherein the link graph is generated based on the relevancy score determined for each of the set of objects;
- assign a weight to each of the plurality of sentences based on a retention probability, wherein the retention probability is determined based on a position of a sentence in flow among the plurality of sentences and an interaction of the sentence with remaining sentences in the plurality of sentences;
- generate a summarized content from the plurality of sentences based on the user preferences, the link graph, and the weight associated with each of the plurality of sentences, and wherein the user preferences comprise a percentage of summarization requested by a user for the content; and
- alert the user when the percentage of summarization requested by the user for the content is below a summarization threshold.

8. The system of claim 7, wherein the processor instructions further cause the processor to:
- retrieve the plurality of sentences from the content and the user preference; and
- extract the set of objects from the plurality of sentences based on a plurality of parameters, wherein the plurality of parameters comprise a type of interaction and a nature of interaction of each object within the set of objects.

9. The system of claim 8, wherein the set of objects are extracted by segmenting each of the plurality of sentences into part of speech using a Natural Language Toolkit (NLTK) mechanism.

10. The system of claim 7, wherein the relevancy score for each object in the set of relevant objects is above a predefined relevancy threshold.

11. The system of claim 7, wherein the processor instructions further cause the processor to render the summarized content to the user, wherein the summarized content comprises a set of sentences extracted from a plurality of sentence based on the user preference.

12. The system of claim 7, wherein the processor instructions further cause the processor to train an AI model to generate smooth transition between the set of sentences in the summarized content.

13. A non-transitory computer-readable storage medium for summarizing content based on user preferences, having stored thereon, a set of computer-executable instructions causing a computer comprising one or more processors to perform steps comprising:
- identifying a set of relevant objects from a set of objects based on a relevancy score corresponding to each of the set of objects extracted from a plurality of sentences, wherein the relevancy score for each of the set of objects is determined based on an associated attention score, probability score, and domain score, and wherein the plurality of sentences are retrieved from the content;
- generating a link graph between each of the plurality of sentences, wherein the link graph is generated based on the relevancy score determined for each of the set of objects;
- assigning a weight to each of the plurality of sentences based on a retention probability, wherein the retention probability is determined based on a position of a sentence in flow among the plurality of sentences and an interaction of the sentence with remaining sentences in the plurality of sentences;
- generating a summarized content from the plurality of sentences based on the user preferences, the link graph, and the weight associated with each of the plurality of sentences, wherein the user preferences comprise a percentage of summarization requested by a user for the content; and
- alerting, by the content summarization device, the user when the percentage of summarization requested by the user for the content is below a summarization threshold.

* * * * *